Patented Mar. 16, 1954

2,672,059

UNITED STATES PATENT OFFICE 2,672,059

SPROCKET CHAIN

William P. Graetz and James H. McAuley, Bremen, Ohio, assignors to McAuley Manufacturing, Inc., Bremen, Ohio, a corporation of Ohio Application February 10, 1950, Serial No. 143,464

5 Claims. (Cl. 74—248)

Our invention relates to a sprocket chain. It has to do, more particularly, with a chain made of interlocking links formed of stampings.

It is very desirable for many uses to provide a flat chain which not only can pass around a sprocket but which also can flex laterally, for example, during its travel between the sprockets over which it is passed. Furthermore, it is sometimes desirable that this chain be capable of being twisted about its longitudinal axis. In the past, attempts have been made to provide a chain of this type, but such chain has been extremely expensive since it has been usually formed of cast or wrought links.

It is the main object of our invention to provide an inexpensive chain which is composed of interlocking links which consist of stampings that can be manufactured on a mass production basis at a very low cost.

Still another object of our invention is to provide a chain formed of stampings which will be substantially as strong as one made of castings or wrought iron due to the design of the links so as to reduce stress.

Still another object of our invention is to provide a flat chain of the type indicated wherein the links are so designed and connected together that the chain can flex both vertically and horizontally and can even twist about its longitudinal axis.

Various other objects will be apparent.

The preferred embodiment of our invention is illustrated in the accompanying drawing wherein similar characters of reference may be made corresponding parts and wherein.

Figure 1:
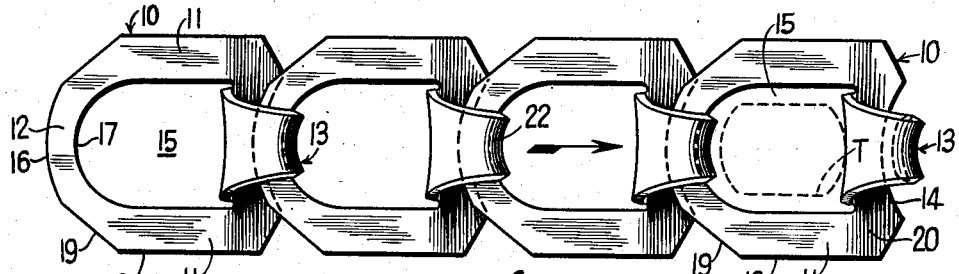
Figure 1 is a plan view of a chain formed according to our invention.

With reference to the drawing, we have illustrated in Figure 1 a flat chain composed of the links 10 which are so connected together that the links may pivot relative to each other vertically at right angles to the plane of the links, may swing relative to each other horizontally or in the plane of the links, or may twist relative to each other.

Figure 5:
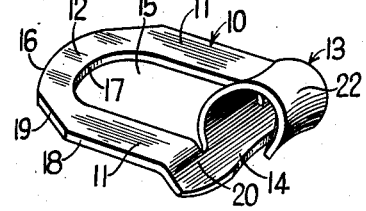
Figure 5 is a perspective view of one of the links.

Each of the links 10 takes the form illustrated in Figure 5. Each link is formed by a stamping operation and consists of a substantially flat body having the side members 11, the rearward transverse pintle member 12 and barrel portion 13 at the opposite end which is adapted to be engaged by the sprocket and which is carried by a rear transverse member 14 that is joined to the side members 11.

The side members 11 are parallel providing a central space 15 for receiving a sprocket tooth T. The member 12 is provided with a backward curved edge 16 and an inside curved edge 17. The curve 16 is joined to the outer edges 18 of the members 11 by chamfered corners 19. The transverse member 14 is bent downwardly and forwardly to provide a slightly concave or trough-like surface 20 on the upper surface of such portion. The barrel portion 13 is of substantially hook form so that its front edge is spaced slightly from the rear front edge of the member 14 to provide the slot 21. In addition, the barrel portion 13 is concavely curved on its outer surface 22 in order to give it more strength and to provide an inner curved bearing surface 23 at its rearward side and an opposed inner curved bearing surface 24 at its forward side. The front edge 17 of the rear transverse member 12 is curved for the purpose of reducing stress and for permitting the chain to flex in the horizontal plane.

Figure 2:
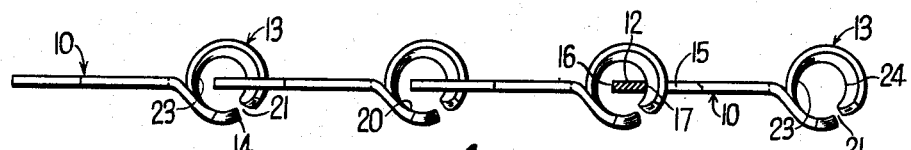
Figure 2 is a side elevational view of the chain in Figure 1.

In assembling the links, they are interlocked, as indicated in Figures 1 and 2, with the rearward pintle member 12 of one link being slipped into the front barrel portion 13 of the adjacent link. Slot 21 is so shaped that the links may be taken apart when necessary.

Figure 3:
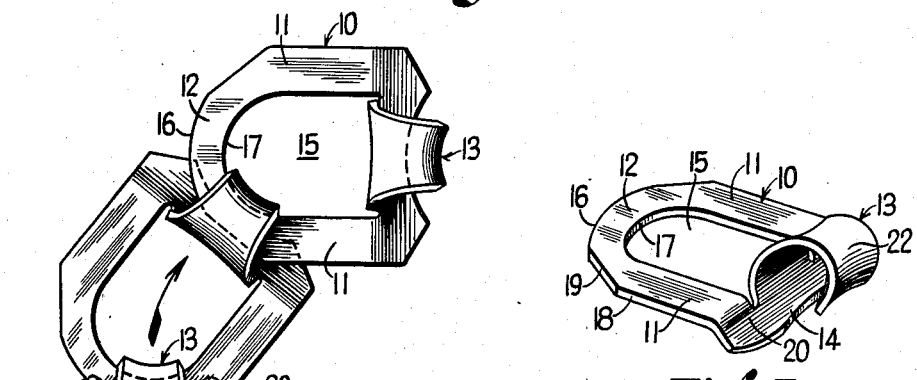
Figure 3 is a view similar to Figure 1 but illustrating how the chain can flex in the plane of the links.
Figure 4:
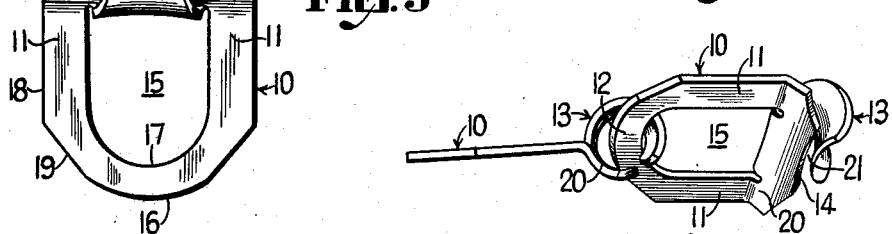
Figure 4 is a perspective view illustrating how one link may twist relative to the other.

In using the chain, it may be passed vertically over suitable sprockets with the teeth of the sprockets extending into the spaces 15 in the links. Each tooth T (Figure 1) of the driving sprocket will be in a space 15 of one link and will engage the rear surface of the barrel portion 13 of the link 10. Due to the concave surfaces 22 of the barrel portions, the tension between the sprockets will keep the chain lengths in line as shown in Figure 2. The pintle portions 12 will, as shown best in Figure 2, fit loosely in the barrel portion 13 to permit considerable movement of the links relative to each other in all directions. As the chain passes vertically around the sprockets, the pintle portions 12 will turn, rock or slide in the barrels 13 against the surfaces 24, permitting the necessary vertical flexing of the chain. Horizontal flexing will be permitted, as shown in Figure 3, by having the inside curved edge 17 of the pintle portion rocked or shifted on the inner rear bearing surface 24 of the barrel portion. Since the backward edge 16 of the pintle portion 12 is curved, it will not touch the oppositely curved rearward surface 23 of the barrel portion 13 and will thus prevent binding between the surfaces. Binding between these surfaces is further precluded by the chamfered corners 19. By turning the rear transverse member 14 downwardly, the bodies of the links can all normally lie in the same plane as shown in Figure 2. Twisting of the links relative to each other will be permitted, as shown in Figure 4, because of the loose fit of pintle member 12 in barrel 13.

Figure 6:
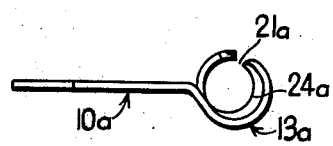
Figure 6 is a side view of one of the links showing a modified form of our invention.

In Figure 6 we show a modified form of the forward end of a chain length wherein the barrel portion 13a is still of hooked form but the position of the slot 21a is reversed and is carried on the top of the length rather than at the underside as is shown in the preferred form in Figure 2. This construction reverses the pull from the top to the bottom of the barrel portion 13a. The other shape of the length 10a is not altered in any way. The pull point is as in the preferred form at 24a.

It will be apparent from the above description that we have provided a flat chain which is formed entirely of links that consist of inexpensive stampings. The chain can flex in two directions at right angles to each other and can twist about its axis.

Various advantages will be apparent.

Having thus described our invention, what we claim is:

1. A chain formed from interlocking links that consist of stampings, each of said links including transversely spaced side members, a forward transverse member and a rear transverse member, one of said members serving as a pintle portion and having outwardly curved inner and outer edges so that the pintle portion curves outwardly in the plane of the link, the other of said members having a hook-shaped pintle receiving portion formed thereon, the hook-shaped pintle receiving portion of one link fitting loosely over the curved pintle portion of an adjacent link to permit transverse relative movement of adjacent interlocking links, said hook-shaped pintle receiving portion being of a transverse width substantially less than the transverse spacing of said side members to facilitate said transverse relative movement of adjacent interlocking links.

2. A chain according to claim 1 wherein the hook-shaped pintle receiving portion extends outwardly from the plane of the link and is concavely curved transversely on its outer surface resulting in a transversely convexly curved inner surface.

3. A chain structure according to claim 2 wherein the hook-shaped portion is bent upwardly from one edge of the transverse member which carries it and then downwardly towards the other edge, said transverse member being also bent downwardly and then upwardly toward the edge of the hook portion to provide a trough-like surface.

4. A chain structure according to claim 3 wherein the outer edge of said last-named transverse member is curved concavely inwardly.

5. A chain structure according to claim 4 wherein the side members of the link are straight and substantially parallel, the transverse member which carries the hook-shaped portion extends substantially straight across the link, and the curved pintle portion is joined to the side members by chamfered corners.

WILLIAM P. GRAETZ.
JAMES H. McAULEY.

References Cited in the file of this patent
UNITED STATES PATENTS

| Number  | Name          | Date          |
|---------|---------------|---------------|
| 361,865 | Dodge         | Apr. 26, 1887 |
| 391,591 | Eckstein, Jr. | Oct. 23, 1888 |
| 454,998 | Gilbert       | June 30, 1891 |
| 518,307 | Corscaden     | Apr. 17, 1894 |
| 581,852 | Dowden        | May 4, 1897   |